US006771263B1

(12) United States Patent
Behrens et al.

(10) Patent No.: US 6,771,263 B1
(45) Date of Patent: Aug. 3, 2004

(54) PROCESSING VOLUMETRIC IMAGE DATA WITH SHADOWS

(75) Inventors: Uwe Behrens, Sankt Augustin (DE); Ralf Ratering, Bornheim (DE)

(73) Assignee: GMD-Forschungszentrum Informationstechnik GmbH, Sankt Augustin (DE)

(*) Notice: Subject to any disclaimer, the term of this patent is extended or adjusted under 35 U.S.C. 154(b) by 0 days.

(21) Appl. No.: 09/807,327
(22) PCT Filed: Dec. 10, 1999
(86) PCT No.: PCT/EP99/07666
§ 371 (c)(1), (2), (4) Date: Aug. 13, 2001
(87) PCT Pub. No.: WO00/22576
PCT Pub. Date: Apr. 20, 2000

(30) Foreign Application Priority Data

Oct. 13, 1998 (EP) .............................................. 98119291

(51) Int. Cl.[7] .............................................. G06T 17/00
(52) U.S. Cl. ...................................... 345/424; 345/629
(58) Field of Search ................................. 345/424, 629, 345/419, 420, 423, 426, 421; 382/173, 174

(56) References Cited

U.S. PATENT DOCUMENTS

| 4,750,171 | A | * | 6/1988 | Kedar et al. | 370/445 |
|---|---|---|---|---|---|
| 5,831,623 | A | * | 11/1998 | Negishi et al. | 345/424 |
| 6,014,143 | A | * | 1/2000 | Naqvi et al. | 345/424 |
| 6,115,048 | A | * | 9/2000 | Cline et al. | 345/424 |
| 6,298,148 | B1 | * | 10/2001 | Cline et al. | 382/128 |
| 6,396,492 | B1 | * | 5/2002 | Frisken et al. | 345/420 |
| 6,407,737 | B1 | * | 6/2002 | Zhao et al. | 345/424 |
| 6,483,518 | B1 | * | 11/2002 | Perry et al. | 345/590 |
| 6,603,484 | B1 | * | 8/2003 | Frisken et al. | 345/622 |

FOREIGN PATENT DOCUMENTS

WO  WO 91/18359  11/1991 .......... G06F/15/72

OTHER PUBLICATIONS

Method to generate the shadow of arbitrary–shaped three–dimensional objects, IBM technical disclosure bulletin, vol. 33, No. 2, pp. 146–148, Jul. 1, 1990.
Woo et al., OpenGL Programming Guide: The Official Guide to Learning OpenGL, Addison–Wesley, Version 1.2, 3/e., 1999.
E.A. Segal, "First shadows and lighting effects using texture mapping," Computer Graphics, vol. 26, No. 2, pp. 249–252, Jul. 1992, XP002096276, USA.
"Illumination Models," http://etsiso2.macc.unican.es/~cagd/illumination.pdf.
"The Phong Illumination Model," http://www.cee.hw.ac.uk/~ian/hyper00/polypipe/render/localcomp.html.
Behrens et al., "Enabling Systems for Neurosurgery," In Proc. Computer Assisted Radiology CAR '98 (Tokio, Japan, Jun. 24–27), 1998.
Cabral et al., "Accelerated vol. rendering and tomographic reconstruction using tecture mapping Hardware," In 1994 Symposium on vol. Visualization, pp. 91–98, ACM SIGGRAPH, Oct. 1994.

(List continued on next page.)

Primary Examiner—Matthew C. Bella
Assistant Examiner—Huedung X. Cao
(74) Attorney, Agent, or Firm—Shumaker & Sieffert, P.A.

(57) ABSTRACT

Texture-based volume rendering is a technique to efficiently visualize volumetric data using texture mapping hardware. A method is presented that extends this approach to render shadows for the volume. Although the method does not perform lighting calculations, the resulting image has a shaded appearance. As calculating the shadows is independent of the visualization process, the method can be applied to any form of volume visualization.

3 Claims, 12 Drawing Sheets

OTHER PUBLICATIONS

Kühne et al., "Interactive segmentation and visualization of vol. data sets," In Proc. Visualization '97, 1991.

Lacroute et al., "Fast vol. rendering using a shear–warp factorization of the viewing transformation," In Proceedings of SIGGRAPH '94 (Orlando, Florida, Jul. 24–29, 1994), Computer Graphics Proceedings, Annual Conference Series, pp. 451–458, ACM SIGGRAPH, ACM Press, Jul. 1994.

Laur et al., "Hierarchial splatting: A progressiverefinement method for vol. rending," In Computer Graphics '91 Proceedings), vol. 25, pp. 285–288, Jul. 1991.

Marc Levoy, "Efficient ray tracing of vol. data," ACM Transactions on Graphics, 9(3), pp. 245–261, Jul. 1990.

Tom McReynolds, "Programming with OpenGL: Advanced Techniques," In SIGGRAPH '97 Course Notes, Course No. 11, 1997.

Porter et al., "Compositing digital images," In Computer Graphics (SIGGRaPH '84 Proceedings), vol. 18, pp. 253–259, Jul. 1994.

Reeves et al., "Rendering antialiased shadows with depth maps," In Computer Graphics (SiGGRAPH '87 Proceedings), vol. 21, pp. 283–291, Jul. 1987.

Rushmeier et al., "The zonal method for calculating light intensities in the presence of a participating medium," In Computer Graphics (SI&^RAPH '87 Proceedings), vol. 21, pp. 293–302, Jul. 1987.

Sobierajski et al., "Volumetric ray tracing," In 1994 Symposium on vol. Visualization, pp. 11–18, ACM SIGGRAPH, Oct. 1994.

Van Gelder et al., "Direct vol. rendering with shading via three–dimensional textures," In 1996 vol. Visualization Symposium, pp. 23–30, IEEE, Oct. 1996.

* cited by examiner

PROCESSING VOLUMETRIC IMAGE DATA WITH SHADOWS

TECHNICAL FIELD

The invention relates to image processing and, more particularly, to processing volumetric image data of a semitransparent object that generates a shadow.

BACKGROUND

Texture-based volume rendering is a technique to efficiently visualize volumetric data using texture mapping hardware.

In volume rendering, the volume data are typically treated as a semitransparent cloud of voxels (units of volumetric image data) emitting diffuse light. The task is to find per pixel the total intensity of all voxels that contribute to it. The most straightforward method casts a ray through each image pixel and integrates the intensities of all voxels pierced by the ray. Care must be taken to weigh the contribution of voxels further away by the accumulated opacity of the voxels in front.

Otherwise, all voxels of the same luminance have the same brightness on screen and it would be practically impossible to distinguish front from back. Unfortunately, the ray-casting approach is computationally expensive and usually does not allow interactive manipulation of the data. To overcome this limitation, alternative methods have been developed that achieve comparable results in less time, of which texture-based volume rendering promises the highest interactive frame rates.

The use of three-dimensional textures to perform volume rendering was described by Cabral et al., Accelerated volume rendering and tomographic reconstruction using texture mapping hardware, 1994 Symposium on Volume Visualization, pages 91–98. The method differs from so-called image-based volume rendering methods which calculate the final image pixel by pixel, by its object-based approach and its extensive use of image composition and texturing hardware. Whereas image-based methods integrate luminance and opacity over a ray shot through the volume of interest in software, texture-based methods render the data as a stack of textured parallel slices, from back to front, leaving the integration of luminance and opacity to an image composition step that can efficiently be performed in hardware. This speed advantage is impaired by the inferior quality of the created images. Important secondary visual cues like illumination and shadows were formerly hard to integrate at interactive frame rates, if at all.

This is unfortunate, especially in applications like medical visualization, where a thorough understanding of the spatial relationships is crucial. In the context of a neurosurgical operation planning system, we observed that the image quality of texture-based volume rendering often does not sufficiently communicate the orientation of the data-set. While this can partly be overcome as long as the object is moved, the impression vanishes as soon as a still image is examined in closer detail. We therefore searched for methods that add visual cues to the image without spoiling interactivity.

The basic method for rendering volume data with texture mapping works as follows. First, the three-dimensional data-set is loaded into the texture buffer of the graphics subsystem as a three-dimensional texture block. An image is generated by rendering a stack of parallel planes, perpendicular to the viewing direction, from back to front, with each plane being textured with an accordingly oriented slice from the texture block. Each new texture plane is then blended with the contents of the framebuffer by using a suitable blending function. The back-to-front rendering ensures a proper depth relation between the slices, while the purpose of the blending is to ensure that voxels farther away appear with an intensity scaled by the transparency of the voxels in front.

A number of extensions have been proposed to the basic method. Variations of the blending operation allow for different properties to be extracted from the data. Examples are the common "over" operator which implements attenuated integration, similar to image-based volume rendering, or a maximum intensity projection (MIP) operator which can be used to visualize contrast media in medical imaging.

Van Gelder and Kim, in Direct Volume Rendering with Shading via Three-Dimensional Textures, 1996 Volume Visualization Symposium, pages 23–30, extended the method to incorporate diffuse and specular illumination. In a preprocessing step, their method finds the gradients at each voxel. When rendering the volume, the gradient serves to calculate the total light intensity of each voxel. These results are then saved as a new 3D texture that can be rendered. Although this method gives impressive results in terms of additional realism, and improved spatial comprehension can be achieved, it decreases rendering performance on the order of a factor of 10.

These modifications are motivated by the need to improve the visualization with respect to selected aspects of the data. The MIP-variation of the composition operator is used to focus attention towards the area of strongest contrast enhancement, while van Gelder and Kim try to overcome the foggy, dull appearance of the original method and emphasize the underlying isoluminance surfaces and thus the spatial context.

An important secondary visual cue for orientation in a volume are shadows. The superior visual impression of volume data rendered by using ray tracing techniques is caused by the detailed modeling of illumination, including shadows. In the context of a neurosurgical operation planning system, we found that shadows can significantly improve the spatial understanding of volume data, if rendered at interactive frame rates.

The central problem to be solved here is how to decide whether a voxel is shadowed by another voxel. A voxel is in shadow with respect to a light source if any other non-transparent voxel lies on the line of sight between itself and the light source. Thus, to decide whether a voxel is in shadow, a ray is traced to the light source, and the opacity of all intersected voxels is integrated. The amount of light reaching the final voxel is inversely proportional to the accumulated opacity. This technique is known as "shooting shadow rays" in ray tracing. A similar, preprocessing version is at the core of Reeves's shadow map method in Rendering Antialiased Shadows with Depth Maps, Computer Graphics (SIGGRAPH '87 Proceedings), volume 21, pages 283–291, July 1987. In Volumetric Ray Tracing, 1994 Symposium on Volume Visualization, pages 11–18, Sobierajski presented an illumination model for volume rendering taking into account shadows, scattering and other subtle effects, which was successfully used in a state-of-the-art system. Earlier, Rushmeier, in The Zonal Method for Calculating Light Intensities in the Presence of a Participating Medium, Computer Graphics (SIGGRAPH '87 Proceedings), volume 21, pages 293–302, July 1987, developed a similar model, although her approach was based on radiative heat transfer.

In "Method to Generate the Shadow of Arbitrary-Shaped Three-Dimensional Objects," IBM Technical Disclosure Bulletin, vol. 33, no. 2, Jul. 1, 1990, pages 146–148, a method for generating the shadow of an arbitrary-shaped three-dimensional object is disclosed wherein the object is totally opaque. Moreover, E. A. Segal, in "Fast Shadows and Lighting Effects Using Texture Mapping," Computer Graphics, vol. 26, no. 2, July 1992, pages 249–252, discloses a method for generating shadows and lighting effects using texture mapping wherein again the objects displayed are opaque.

SUMMARY

The present invention relates to a method that extends this approach to render shadows for the volume. The method takes advantage of fast framebuffer operations modem graphics hardware offers, but does not depend on any special purpose hardware.

The visual impression of the final image is significantly improved by bringing more structure and three-dimensional information into the often foggy appearance of texture-based volume renderings. Although the method does not perform lighting calculations, the resulting image has a shaded appearance, which is a further visual cue to spatial understanding of the data and lets the images appear more realistic.

As calculating the shadows is independent of the visualization process it can be applied to any form of volume visualization, though volume rendering based on two- or three-dimensional texture mapping hardware makes the most sense. Compared to unshadowed texture-based volume rendering, performance decreases by less than 50%, which is still sufficient to guarantee interactive manipulation of the volume data. In the special case where only the camera is moving with the light position fixed to the scene there is no performance decrease at all, because recalculation has only to be done if the position of the light source with respect to the volume changes.

It is an object of the present invention to provide a comparatively simple method to accurately render shadowed semitransparent volumes with only a moderate increase in rendering time. The method is fast, easy to implement, and can be extended to multiple light sources.

According to the invention, this object is solved by a method for processing volumetric image data of a semitransparent object generating a shadow due to light of a light source impinging onto the object in a direction defined by a light vector, wherein each volumetric image data represents a value of transparency and a value of brightness and wherein the method comprises:

(a) dividing the volumetric image data into several image slice data representing individual layers of the object arranged sequentially behind each other, (b) on the basis of the light vector and the values of transparency of the image slice data of the object layer being closest to the light source, generating a shadow value for each image slice data of the object layer being closest to the light source and storing these shadow values, (c) overlaying the stored shadow values generated in step (b) and the brightness values of the image slice data of the object layer second most close to the light source according to the light vector and the distance between these two adjacent object layers, (d) on the basis of the light vector and the values of transparency of the image slice data of the object layer second most close to the light source, generating shadow values for each image slice data of the second most close object layer and adding these values to the stored shadow values, (e) overlaying the stored shadow values generated in step (d) and the brightness values of the image slice data of the object layer third most close to the light source according to the light vector and the distance between these two adjacent object layers, (f) performing steps (d) and (e) for each object layer which is next in the direction away from the light source, and (g) volume rendering the brightness values of the image slice data of the object layer closest to the light source and the overlaid shadow and brightness values of the image slice data of all the other object layers to display the semitransparent object including the shadow generated by the semitransparent object.

Preferably, overlaying comprises a step of blending the brightness and shadow values according to a blending function.

According to the invention, the shadows cast by the individual volumetric image data (voxels) are calculated successively from layer to layer of the object. In order to render a volume, the volumetric image data are divided into several groups of image slice data wherein the groups represent individual layers of the object arranged sequentially behind each other. According to the invention, there is calculated the accumulated shadow generated by the individual image slice data of the layers. Each volumetric image data represents both a value of transparency and brightness. Preferably to each volumetric image data a brightness value is associated wherein the transparency value can be regarded as the inverse of the brightness value.

After having calculated the shadow values of each image slice data of a respective layer, these shadow values are combined with the brightness values of the image slice data of the object layer being next in the direction of the light vector. These overlaid shadow and brightness values for each object layer are stored. After all the image slice data of all the layers are processed in that the shadows cast by them onto adjacent layers are calculated, the stored overlaid shadow and brightness values are used for rendering the shadowed volume/object. In this rendering process for showing the image slice data of the layer closest to the light source, the brightness values of its image slice data are used. Namely, there is no shadow which cast onto this layer.

When overlaying the generated shadow values of the image slice data of a layer and the brightness values of the image slice data of the layer next in the direction of the light vector, the orientation of the light vector and, in particular, the angle of the direction of the light vector and the viewing direction, as well as the values of transparency of the image slice data, are taken into consideration. The location at which a shadow resulting from the transparency value of an image slice data hits the layer next in the direction of the light vector is calculated on the basis of the orientation of the light vector and the distance between two adjacent object layers. This distance is a distance between the centers of two voxels of two adjacent layers.

The advantage of the method according to the invention is that it is based on the well-known texture-based volume rendering applied which according to the invention is to a semitransparent object/volume including shadows. In that the individual parts of the overall shadow generated by the object are calculated on a layer-to-layer-basis, the results again are layer-oriented image slice data, which can be rendered using texture mapping.

The invention will described in more detail referring to a preferred embodiment as shown in the drawing.

DETAILED DESCRIPTION

Figure 1:
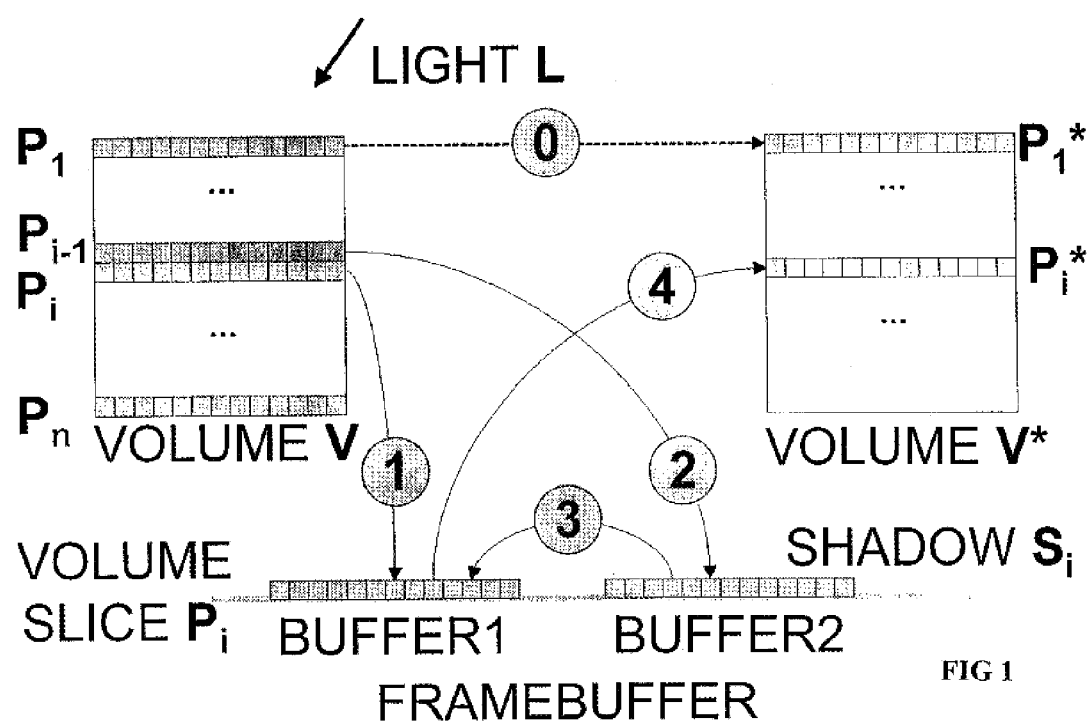
FIG. 1 is a schematic overview of the method according to the invention.

FIG. 1 shows a schematic overview of the method according to the invention taking an unshadowed volume V as input and producing a shadowed volume V* as output by doing framebuffer operations. Buffer1 and buffer2 are reserved pixel areas inside of the framebuffer where the operations take place. In buffer2, all shadows of slices $p_1$, . . . , $p_{i-1}$ are accumulated, while in buffer1 this accumulated shadow $s_i$ is applied to the actual slice $p_i$. The resulting shadowed slice $p_1^*$ is then transferred to the shadowed volume.

Figure 2:
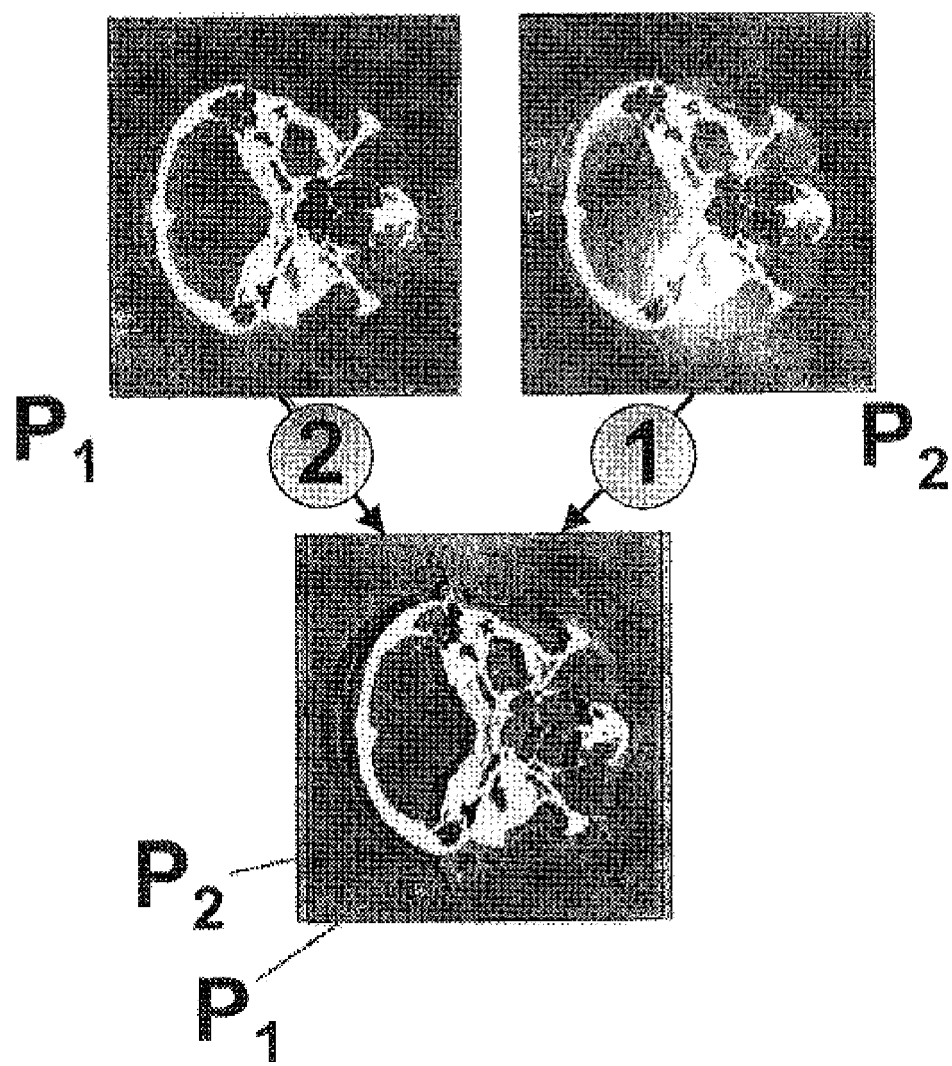
FIG. 2 illustrates a technique for producing a shadowed image.

FIG. 2 shows a simple technique: To get the shadow of $p_1$, $p_2$ is drawn with the same texture, but with a special blending function and an offset into the framebuffer. Then $p_1$ is blended with the over-operator into the framebuffer and so the impression of a shadowed image is produced. In the example, one can see a CT image with bones classified as being opaque and white and the surrounding tissue being grey and semitransparent. Note how the opaque bones cast a stronger shadow onto the background than the semitransparent tissue.

Figure 3:
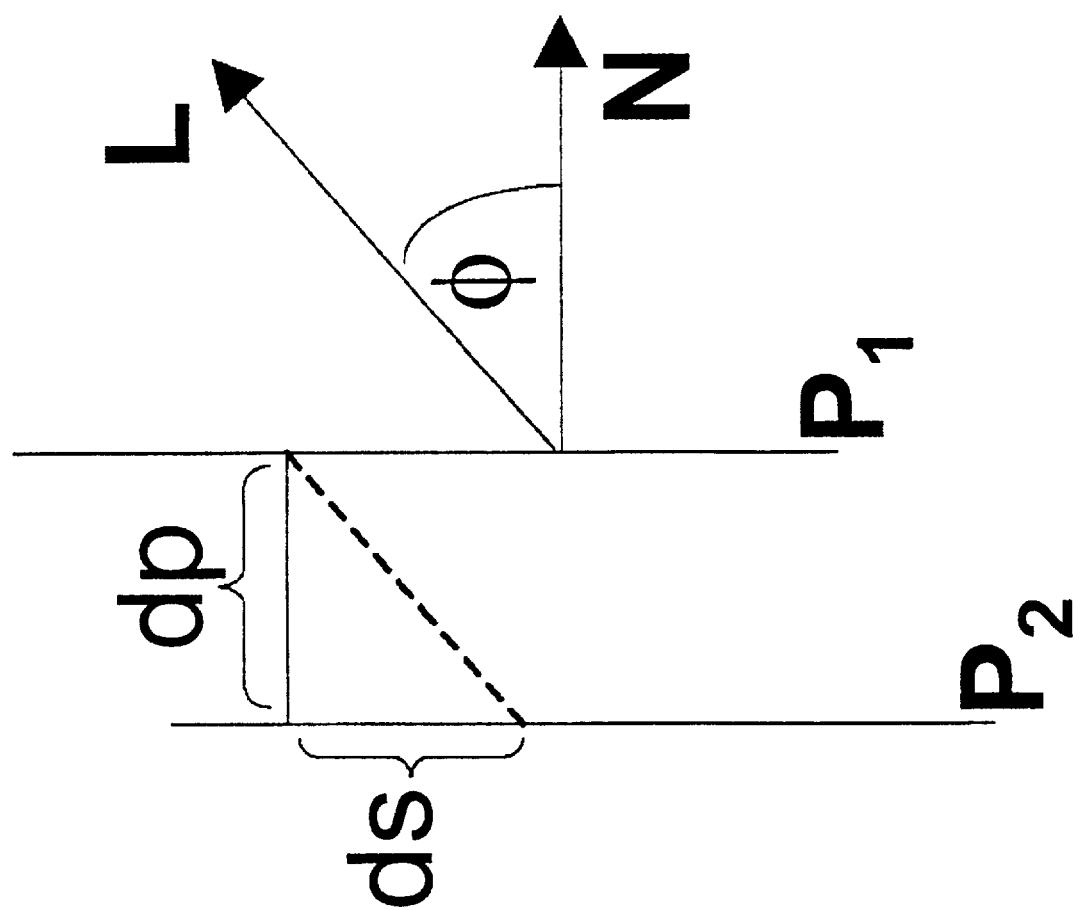
FIG. 3 depicts polygon $p_1$ textured with a volume slice casting a shadow onto background polygon $p_2$ and the shift ds for the shadow offset.

In FIG. 3, polygon $p_1$ textured with a volume slice casts a shadow onto background polygon $p_2$. The tangent of the angle $\phi$ in the triangle defines the shift ds for the shadow offset.

Figure 4A:
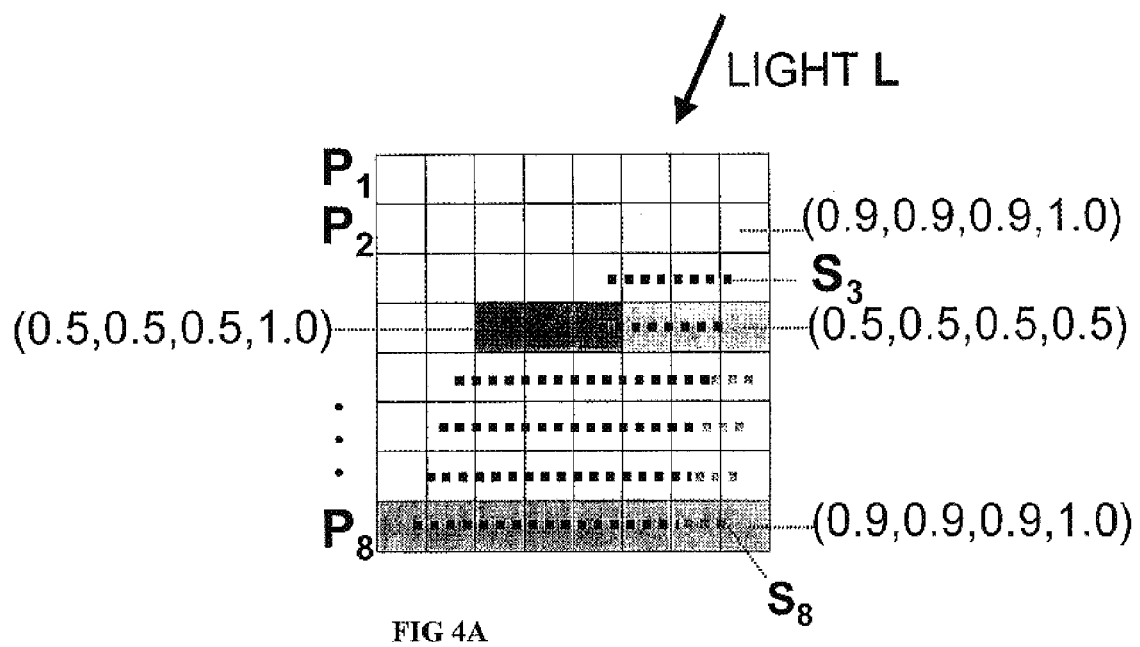
FIGS. 4A and 4B show shadows propagated through a volume.
Figure 4B:
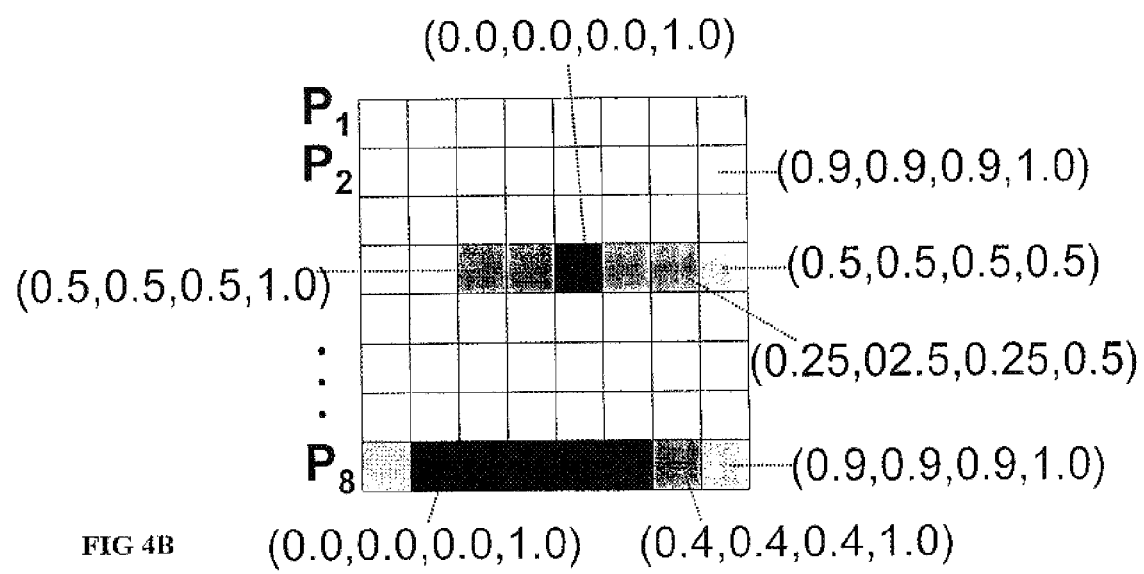

FIGS. 4A and 4B depict a light source L shining from the right top onto the volume. The shadows, the dotted lines, are propagated through the volume and accumulate the voxels' $\alpha$-values. The voxels in the resulting volume V* are then darkened according to their own transparency and to that of the shadows that fell onto them. Note how the semitransparent voxels in $p_4$ are less darkened than the same colored opaque voxels. Also note, how in $p_8$ the semitransparent voxels of $p_4$ cast a lighter shadow than the opaque ones, and how the shadow from $p_2$ is propagated to $p_8$.

Figure 5:
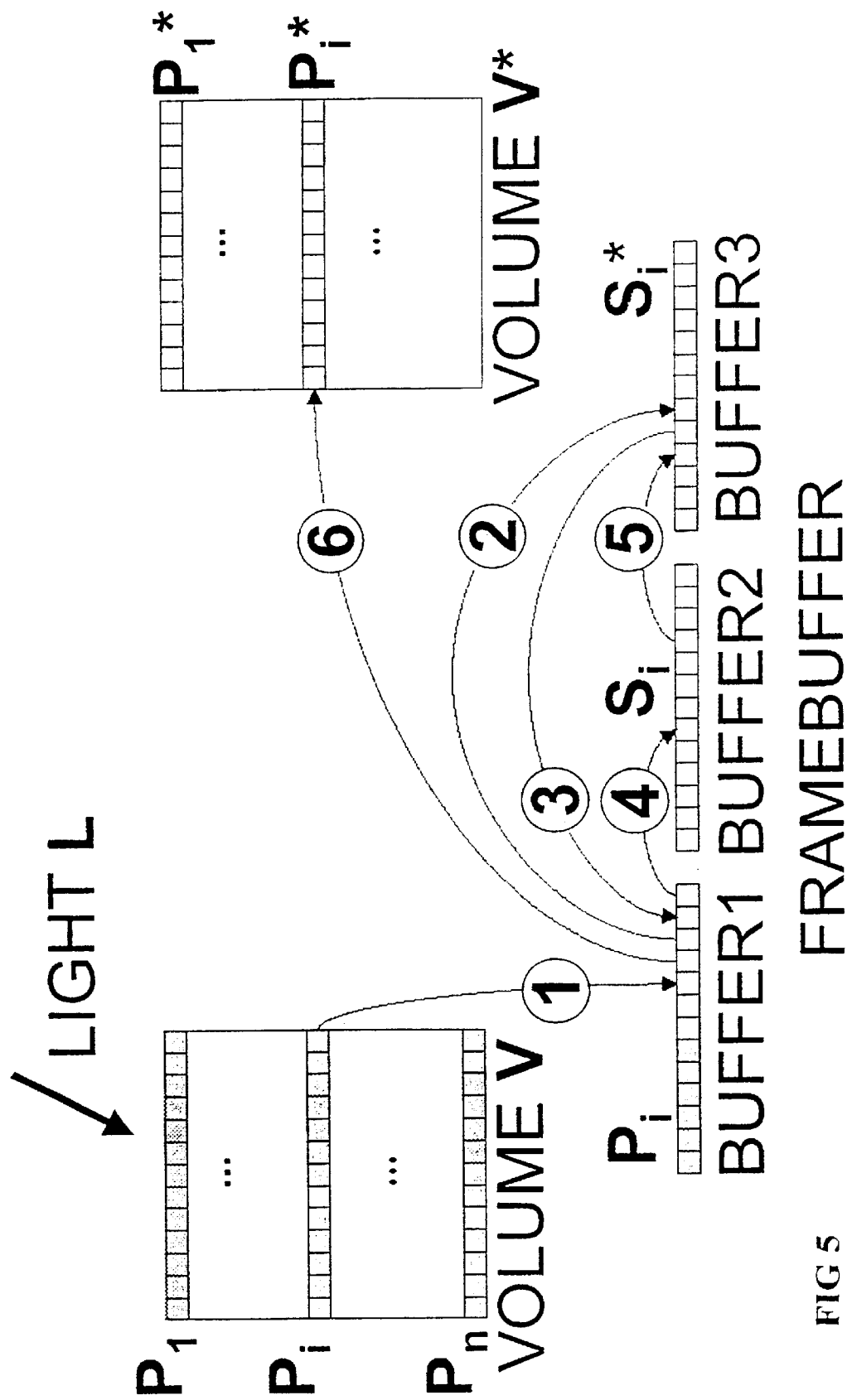
FIG. 5 is another schematic overview of the method according to the invention.

FIG. 5 depicts an overview of the implemented method. We have added buffer3 to make a copy of the accumulated shadow $s_i$ that can be mixed with $p_i$'s $\alpha$ in step 2.

Figure 6A:
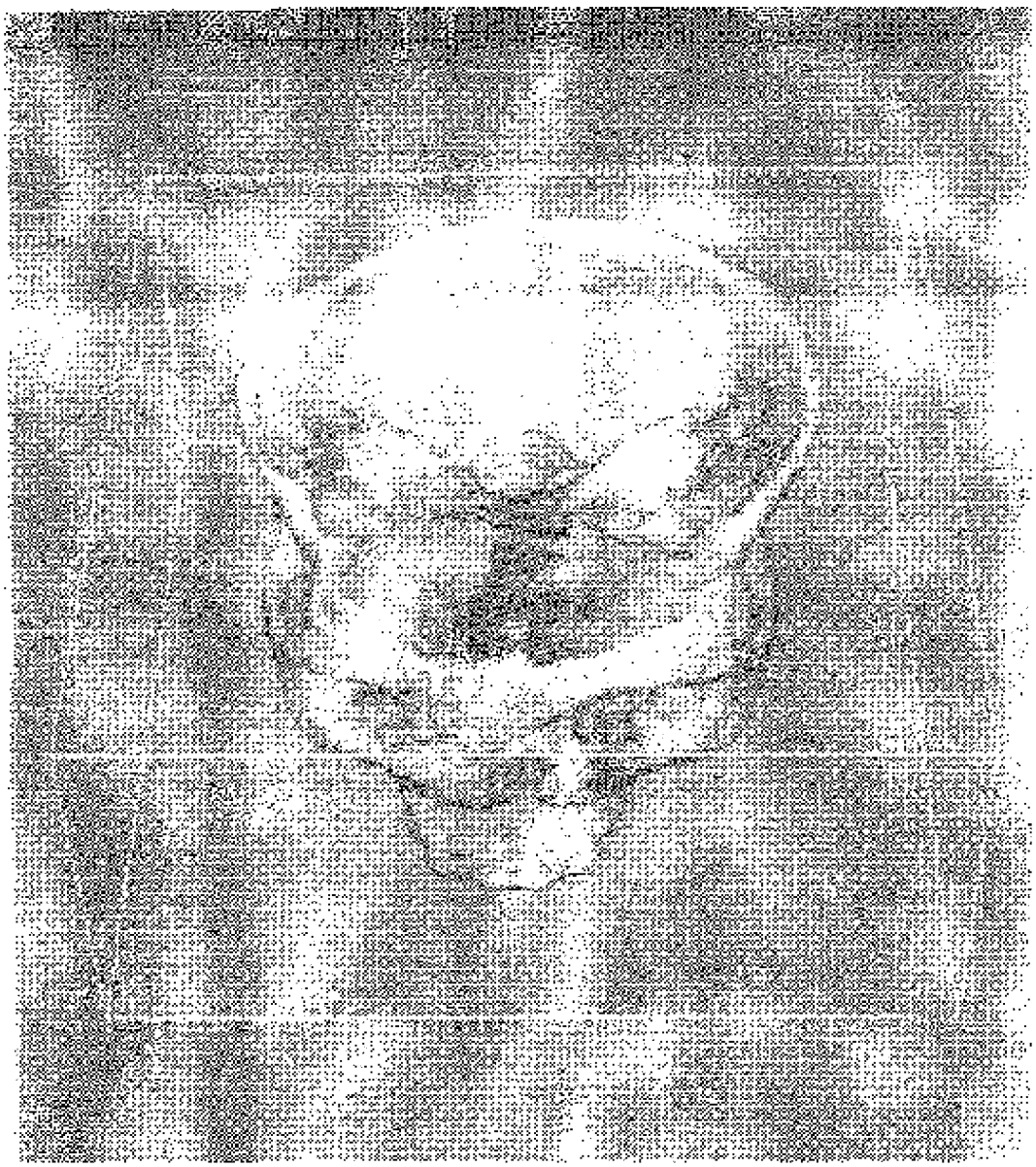
FIGS. 6A and 6B depict texture-based volume renderings of an unshadowed and a shadowed CT data-set, respectively.
Figure 6B:
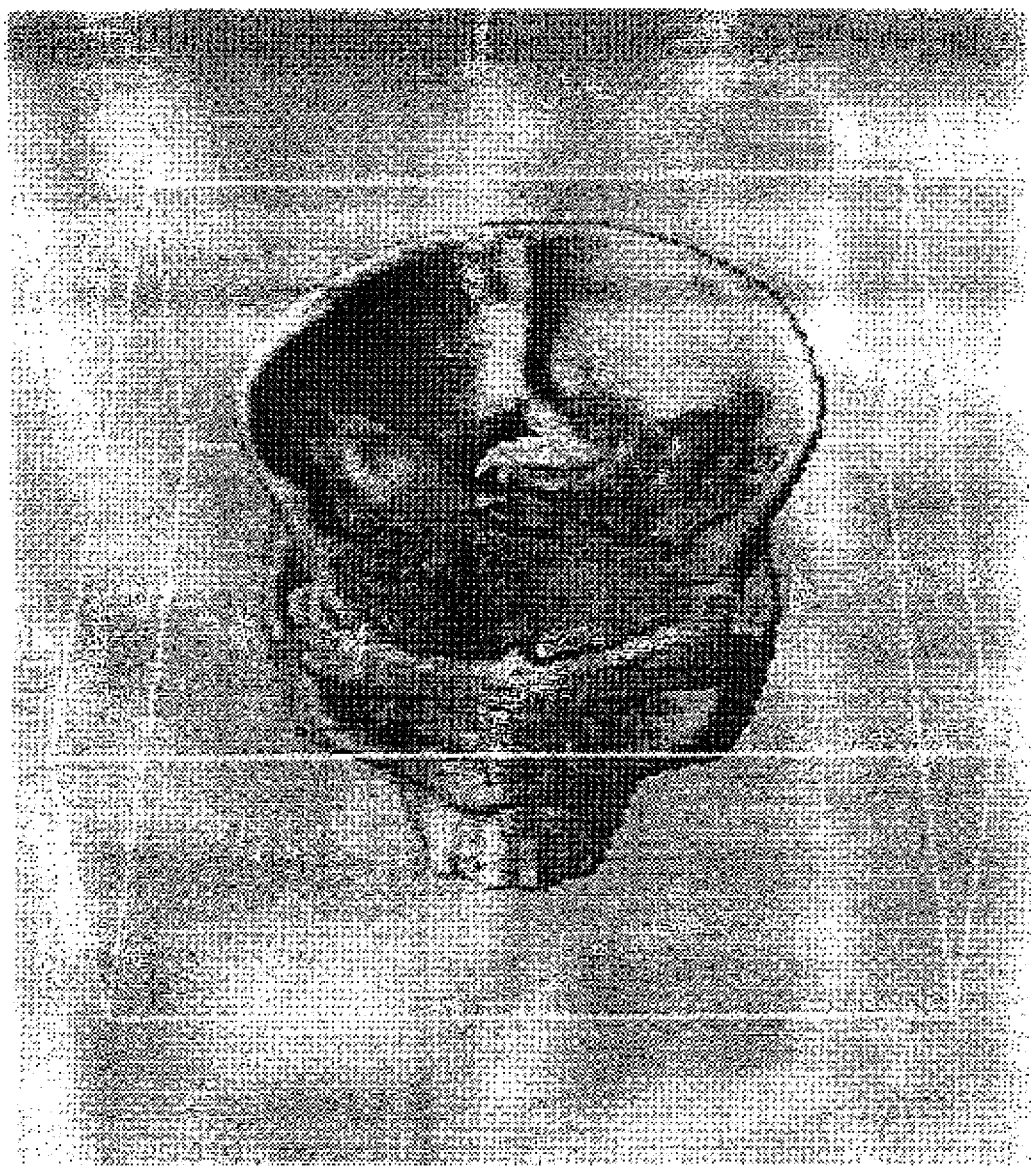

FIGS. 6A and 6B show texture-based volume renderings of an unshadowed and a shadowed CT data-set, respectively. The image in FIG. 6B looks more realistic, which results from some kind of "false" or "virtual" illumination that comes as a side effect with the shadows.

Figure 7A:
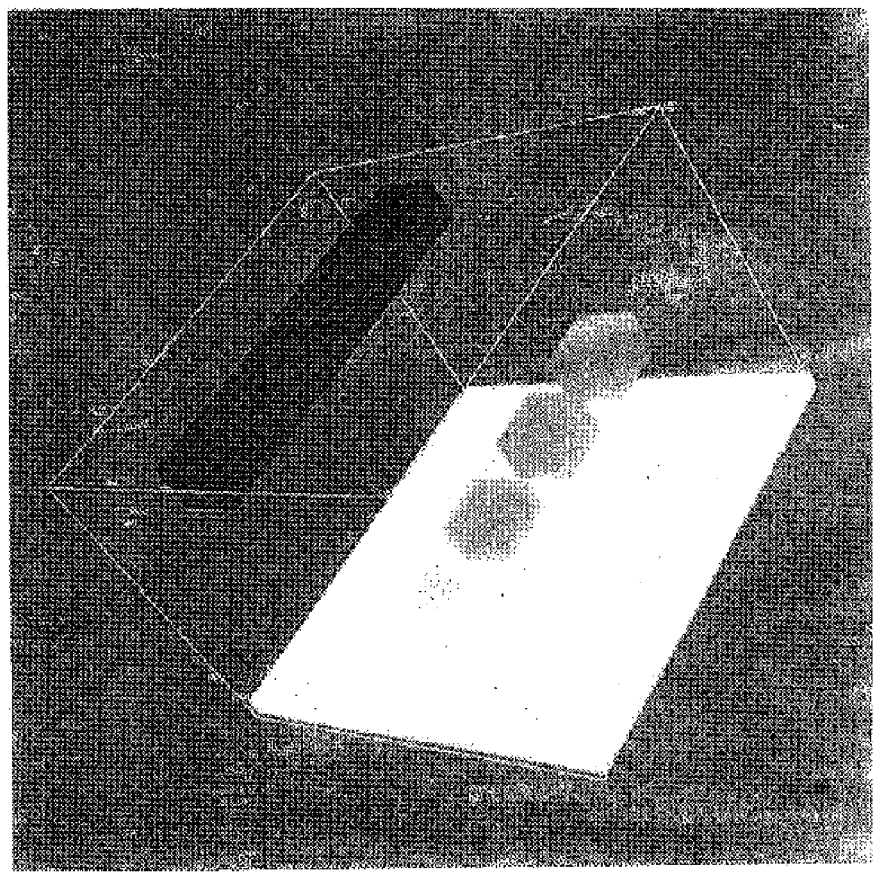
FIGS. 7A and 7B depict, respectively, an unshadowed and shadowed texture-based volume renderings of a geometrical data-set.
Figure 7B:
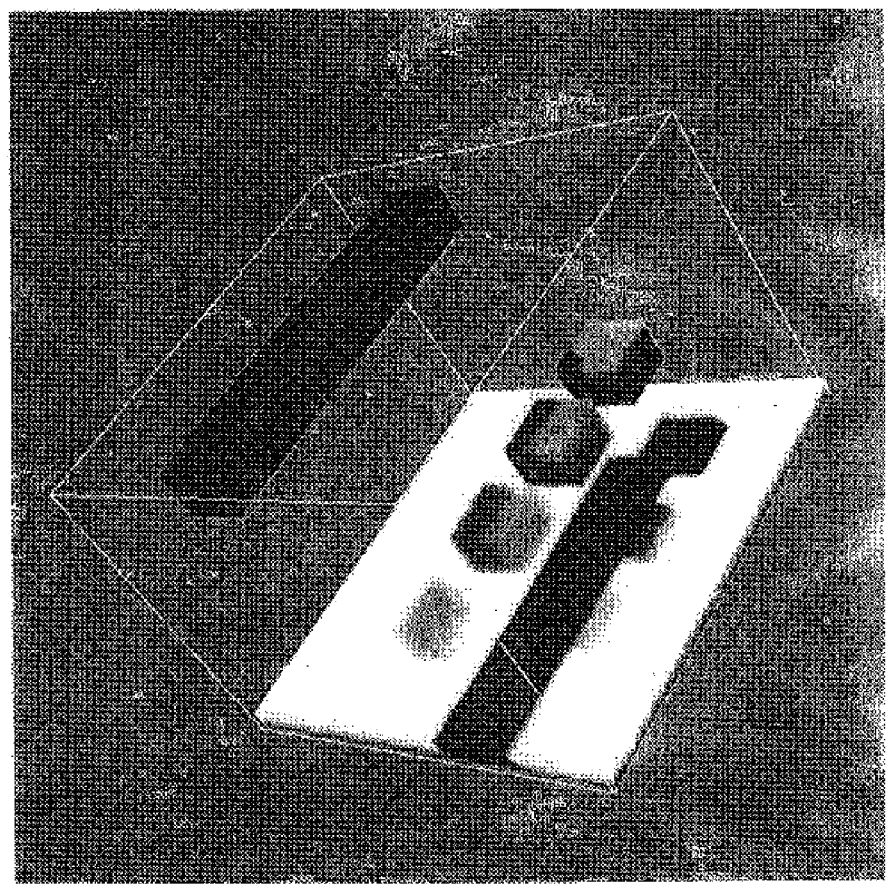

FIGS. 7A and 7B offer a comparison of unshadowed and shadowed texture-based volume renderings of a geometrical data-set. This 128×128×64 voxel sized data-set was generated to control the correct calculation of the shadows. The images were rendered using 256 parallel textured planes. In the scene, there is the large block on the top with the four smaller blocks below, and the four smaller blocks have different transparencies. In the shadowed image of FIG. 7B, one can see how the different smaller blocks cast different shadows on the ground and how the shadow of the large block appears different on the smaller blocks. One can also see the virtual diffuse illumination effect here, because surfaces that face away from the light source are darker than others.

Figure 8A:
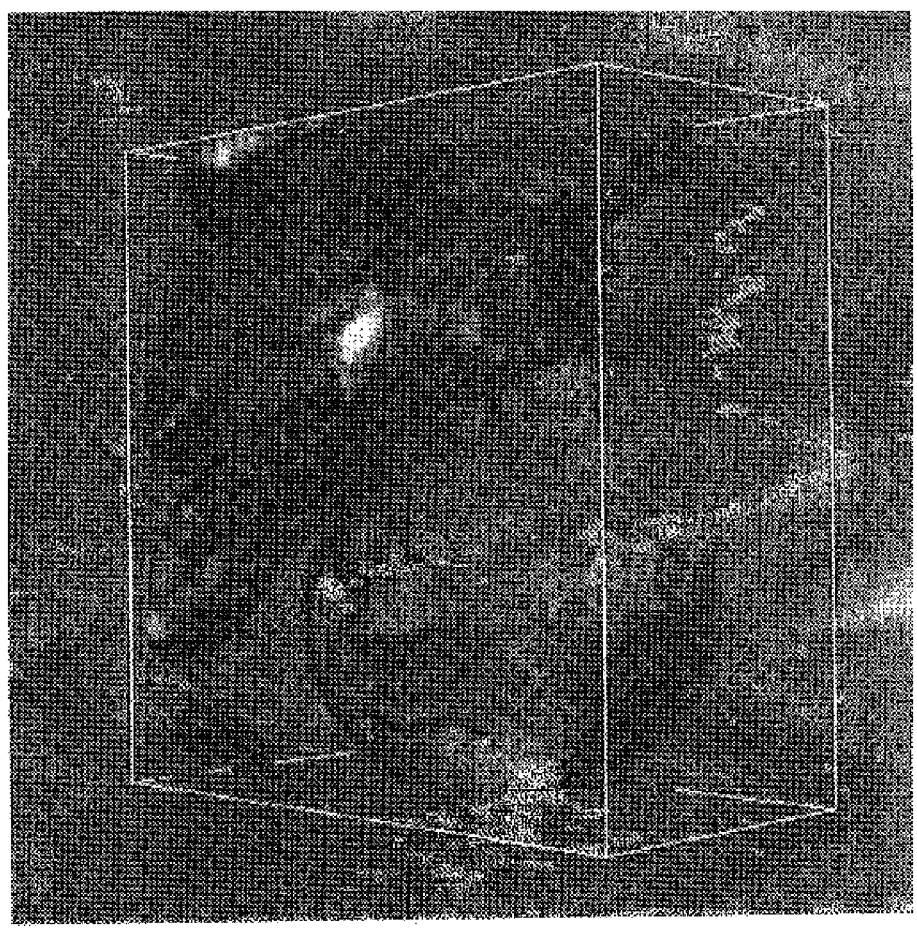
FIGS. 8A and 8B show, respectively, unshadowed and shadowed screenshots of a fetus from a volume rendering.
Figure 8B:
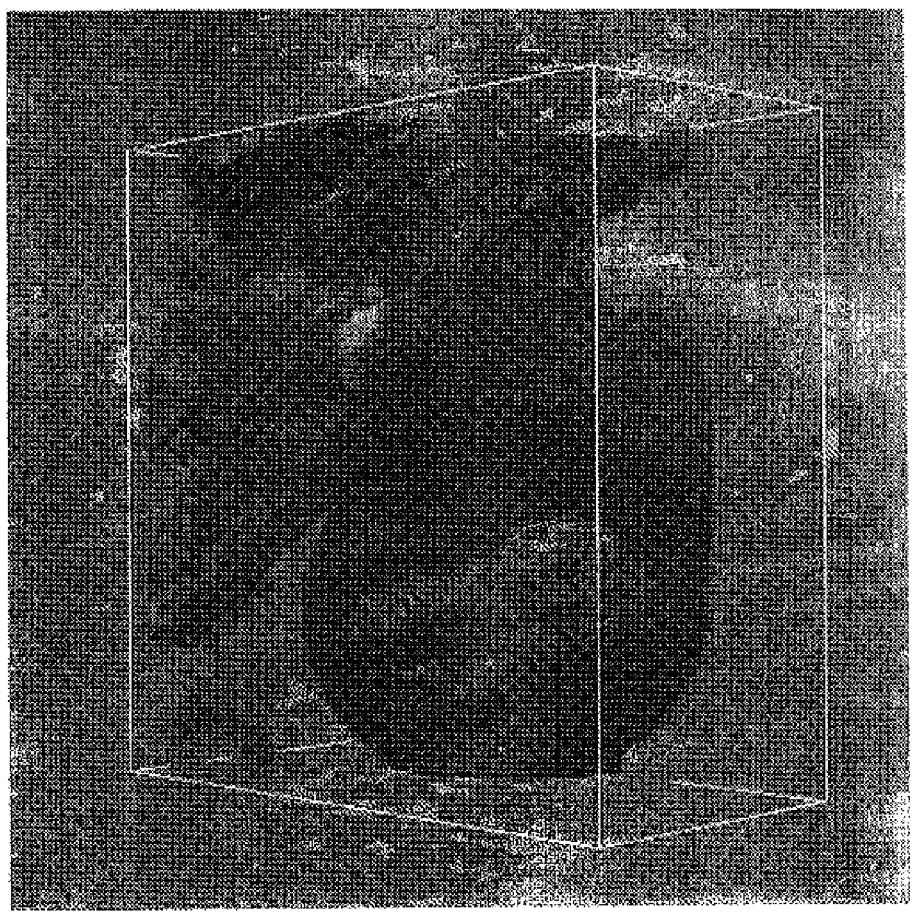

FIG. 8A and 8B show, respectively, unshadowed and shadowed screenshots of a fetus from a volume rendering with the 128×128×64 voxel sized data-set mapped as a 3D-texture onto 256 parallel planes. Note how in FIG. 8B the shadow casts from the fetus's arm onto its face. Although the shadowed image looks more realistic, there are some details covered by the shadow. But the data-set can now be explored by interactively moving the light source, so details will be revealed that cannot be seen in the unshadowed image.

The input to our method is the volume data V consisting of image slices $p_1, \ldots, p_n$ and a light vector L. Every time L changes, the method produces a new output volume V* that contains the shadowed slices $p_i^*, \ldots, p_n^*$. This is done by calculating a shadow map $s_i$ on the fly for each input volume slice $p_i$ in the framebuffer. Briefly, we get the following overview of our method as is illustrated in FIG. 1:

0. copy $p_1$ to $p_1^*$ for all slices $p_2$ to $p_n$:

1. draw slice $p_i$ into buffer1
2. get shadow $s_i$ by mixing slice $p_{i-1}$, into shadow $s_{i-1}$ in buffer2
3. get $p_i^*$ by mixing new $s_i$ into $p_i$ in buffer1
4. read shadowed slice $p_i^*$ out of buffer1

The resulting shadowed volume V* can be visualized using Cabral's texture-based volume rendering or any other volume visualization method. Thus, whenever the volume is rotated or moved with respect to the light source, new shadow maps and a new shadowed volume are created. When light and volume positions remain fixed and only the camera moves, the voxels lying in the shadow stay the same, so no reprocessing is necessary.

Note that the shadow inside the volume is built incrementally by this method. As the i–1 front slices contribute to the shadow for a slice $p_i$, a seemingly simple but actually complex method would have to go through all these slices $p_1, \ldots, p_{i-1}$, again for each i. While this would give us $O(n^2)$ complexity, our method is of complexity $O(n)$, because there are only four additional operations necessary to generate a shadowed out of an unshadowed slice. As these operations are all pixel drawing, reading or copying operations, one can anticipate that this method performs very fast on modem graphics hardware.

The real work in our method is, of course, done in steps and 3. For step we have to find out how to accumulate the shadows inside the volume, while in step the shadow must be applied to a volume slice. To understand how this works in detail, we will first show how to cast the shadow of a single slice onto a plain polygon, then see what happens, if the shadow falls onto another slice, and last but not least, how the shadows are propagated through the volume.

Consider the situation when we want a polygon $p_1$, textured with a single volume slice, to cast a shadow onto a plain background polygon $p_2$. The technique at the core of our method is, that we map the same texture onto $p_2$ and then do the following two steps, as illustrated in FIG. 2:

1. Draw $p_2$ with a special blending function and offset ds
2. Draw $p_1$ with the over-operator This simple technique gives the impression of $p_1$ casting a shadow onto $p_2$. The two important details here are, how to calculate the correct offset ds for $p_2$, and how to blend $p_2$ into the background.

Looking at FIG. 2 again, one can imagine that the shadow is cast further to the left as the light moves towards the right. This shadow offset solely depends on the distance dp between the two polygons and the angle $\phi$ between the light vector L and the polygon normal N:

$$ds = dp \cdot \tan\phi \qquad (1)$$

Note that we restrict the light position by $|\phi|<45°$ to avoid the discontinuities of the tangent. Note also that if $\phi=45°$, ds=dp, as shown in FIG. 3.

If we initially take a look at the framebuffer, we find it regularly filled with the background or destination color $c_d=(r_d, g_d, b_d)$ and the $\alpha$-value $\alpha_d$. What we want to achieve is, to darken $c_d$ where the background polygon $p_2$ is not transparent and thus, the image polygon $p_1$ casts a shadow.

This is no binary decision since the opacity of $p_1$'s pixels is proportional to the intensity of the shadow that is cast. If we use the following blending function to draw $p_2$ into the framebuffer, we get the shadow of $p_1$:

$$c = (1-\alpha_s)c_d \qquad (2)$$

with $c_d$ being the color of the background, $\alpha_s$ the $\alpha$-value of $p_2$ and c the resulting color in the framebuffer. To simplify the further formulas we assume shadows to be colorless, so we can leave out the color values of $p_1$ since the shadow is only influenced by the transparency. This is not a real restriction, though, because the blending function could be extended to model colored shadows as well.

While blending function (2) works correctly if the framebuffer is initially empty, things get a little more complicated if we want to cast the shadow onto an image that was already drawn into the framebuffer. We then have to take into account the $\alpha$-values of the already-drawn image in two ways: On the one hand we have to keep $\alpha_d$ unchanged, because a shadow that falls onto an object should not manipulate its transparency. On the other hand we have to integrate $\alpha_d$ into the blending equation, because shadows appear stronger on opaque objects than on semitransparent ones. Especially in the case $\alpha_d=0$ there should not be drawn any shadow at all. So we get the modified blending equations:

$$c = (1-\alpha_d\alpha_s)c_d$$

$$\alpha = \alpha_d \qquad (3)$$

Remember that the product $\alpha_d\alpha_s$ is high for strong shadows on opaque objects, so we have to take its inverse to attenuate the color components of the image that is to be shadowed.

Now that we have all the tools we need to let one volume slice cast a shadow onto the next one, we want to apply this procedure to a complete volume.

If one wants to shadow a complete volume, care must be taken to ensure that shadows being cast on transparent parts of one slice must appear on the non-transparent parts of the next slice underneath. In other words, the shadow must be recast from slice to slice through the whole volume as is shown in FIGS. 4A and 4B. Several steps of this recasting may be necessary, if more than one slice is transparent. This non-local property is the reason why shadows are hard to model in traditional, surface-oriented computer graphics. Fortunately, this can easily be integrated into our method.

Let us now take a closer look at the procedure in FIG. 1 again:

Step 1 simply draws a single slice into the framebuffer.

Step 2 adds one slice to the accumulated shadow. We already know that we have to take the offset ds into account here, according to equation (1), but we do not know yet which blending function to use to get the correct result.

Step 3 applies the accumulated shadow to the actual image. This is done by using blending function (3), because we want to cast a shadow onto a slice that contains different transparencies.

Step 4 reads the result out of the framebuffer.

So all that is left to do is to find an appropriate blending function for step 2 to accumulate the shadows. The blending function for this step should not involve color calculations, since, for colorless shadows only $\alpha$-values are needed. We have to decide, how the $\alpha$-value of a new volume slice contributes to the already accumulated shadow in buffer2. In equation (2), we defined the shadow's intensity by the transparency of the shadow image, in that the shadow is lighter, where the original volume slice is more transparent. This means the shadow's intensity is proportional to the $\alpha$-value of the original image.

So let us assume the situation where we have the accumulated shadow of all i-1 front slices drawn into the framebuffer. Each time a new image polygon is added to the shadow image, the accumulated opacity must be increased according to the image's $\alpha$-value. A blending function that describes this effect reasonably well is:

$$\alpha = 1-(1-\alpha_s)(1-\alpha_d) \qquad (4)$$

Note that the framebuffer has to be initially filled with $\alpha=0.0$ to get correct results.

By using blending function (4) for step 2 we assure that the shadows are correctly combined when we cross the volume, while equation (3) lets shadows appear stronger on opaque voxels than on transparent ones. The following discussion will show how the two blending functions can be implemented.

We implemented our method using the OpenGL graphics API. It takes advantage of fast framebuffer operations like pixel drawing, copying and reading. We used the three-dimensional texture mapping extension to the OpenGL API to visualize the shadowed volume, though the method can also be implemented on platforms where only two-dimensional textures are available. This is accomplished by the fact that the process of shadowing the volume is independent of the visualization process. The method was implemented on a Silicon Graphics Octane workstation that was also used for benchmarking tests.

The main problem we first had to deal with for the implementation was that OpenGL does not offer direct equivalents to the blending functions (3) and (4). We had to consider how to modify the method, so that the OpenGL blending functions could be applied.

The OpenGL API offers countless ways to combine the pixels of an image with those already in the framebuffer. This may be done either with blending functions, or with logical operations. Unfortunately, our rather sophisticated equations (3) and (4) cannot be directly translated into OpenGL API calls.

So let us take a closer look at the two equations again. If we invert the α-values in (4) we get the following simpler blending function for the accumulation of the shadows:

$$\alpha=(1-\alpha_s)\alpha_d \quad (5)$$

This blending function has its OpenGL API counterpart in the glBlendFunc(GL_ZERO, GL_ONE_MINUS_SRC_ALPHA) call, so we are done with accumulating the shadows. Unfortunately, this function now causes strong shadows to have low α-values, which of course is not a very intuitive definition, because one would expect strong shadows to have a high opacity. But if we remember that we want to lower the colors of the image in the framebuffer, we can imagine that it will be handier to have the shadow's α-values inverted. This would result in the following simple multiplication to darken the color-values of $p_i$ according to the α-values of the shadow $s_i$:

$$c=\alpha_s c_d$$
$$\alpha=\alpha_d \quad (6)$$

This function can be implemented using the glBlendFunc (GL_ZERO, GL_SRC_ALPHA) call, if we first block the α-channel of the framebuffer by setting a color mask with glColorMask(GL_TRUE, GL_TRUE, GL_TRUE, GL_FALSE).

If we used function (6) alone, shadows would appear equally strong on structures with different transparencies. To avoid this, we have to introduce an additional blending function, that blends the actual image polygon $p_i$ into the shadow $s_i$ and lowers the α-value of $s_i$ by its own α:

$$\alpha=\alpha_s \alpha_d \quad (7)$$

As we already know, this equation corresponds to the glBlendFunc(GL_ZERO, GL_SRC_ALPHA) call. So for the implementation, we had to divide the two blending functions (3) and (4), into the three simpler ones (5), (6) and (7). To apply these functions we allocated an additional pixel area in the framebuffer and slightly modified our method as is illustrated in FIG. 5:

for all slices $p_1$ to $p_n$:
1. draw image slice $p_i$ into buffer1
2. get $s_i^*$ by mixing $p_i$ into $s_i$ with blending function (7) in buffer3
3. get $p_i^*$ by mixing $s_i^*$ into $p_i$ with blending function (6) in buffer1
4. get shadow $s_{i+1}$ by mixing $p_i$ to shadow $s_i$ with blending function (5) in buffer2
5. make copy of new shadow $s_{i+1}$ in buffer3
6. read shadowed slice $p_i^*$ out of buffer1

Note that the new method added step 5 and split up step 2 of the original method into steps 2 and 3. In step 2, the actual image slice $p_i$ is blended into a copy of the accumulated shadow $s_i$ in buffer3, to reduce the shadow's α-value where $p_i$ is opaque. We have to keep a copy of $s_i$ in buffer2, because the shadow image is lost for our method once we blended $p_i$ into it.

But even with this extended method we only need to draw one volume slice into the framebuffer, do five copying operations and read the resulting image out of framebuffer again to get one shadowed volume slice. However, the method is still expected to run fast, because copying pixel areas inside of the framebuffer can be done very fast on today's graphics hardware.

One of the advantages of our method is that it is possible to move the camera with absolutely no performance decrease compared to the unshadowed volume, if the light position is fixed with regard to the volume. This is due to the fact that the shadow that is cast inside the volume only depends on the light position and is independent of the camera, as can be seen in FIG. 4. Although this is a nice feature, the best spatial information is achieved if camera and light move synchronically, so that the observer gets the impression of a moving object. Only moving the light source with a fixed camera position is very helpful to understand the three-dimensional properties of the data-set as well, as this is like exploring the data-set by shining with a flashlight into the volume. Every movement of the light requires a recalculation of the shadows, though. But if the graphics hardware offers high pixel transfer rates from host memory to the framebuffer, this can be done at interactive frame rates, as benchmarking results show.

One issue we did not mention so far, is the restriction on the light position to have an angle $\phi<45°$ with the normal of the volume slices, like stated in equation (1). This restriction can be easily overcome by our method. If we think of the six faces of the volume cube and their normals $N_1, \ldots, N_6$, we have to find the $N_i$ with the smallest scalar product L. $N_i$. This normal determines in which direction to cross the volume and so, in which orientation the slices have to be taken out of the volume. As these slices are always parallel to the volume axes, there are different ways how to efficiently draw them into the framebuffer.

To draw the single volume slices into the framebuffer, we used the three-dimensional texture mapping extension to the OpenGL API for our implementation. This extension offers an easy way to get arbitrary slices out of the volume and render them into the framebuffer. Step 1 of our method can be performed very fast, because the volume can stay resident in the texture cache as a three-dimensional texture and has not been transferred from host memory to the framebuffer. It also makes no difference in which direction we have to go through the volume according to the light sector, because the position of the slices in the volume can be chosen freely, by assigning the appropriate texture coordinates.

Due to the fact that the slices are always sampled parallel to the volume axes out of the volume, the method can also be efficiently implemented on platforms where no 3D textures are available. This is done by using the glDrawPixel call, which transfers a pixel array out of host memory to the framebuffer. We only have to keep three rotated volume copies resident in the host memory, because the slices can only be taken sequentially out of host memory with the glDrawPixel call. So for each light sector and its opposite sector, there is one volume copy, which makes this process a fast alternative to the three-dimensional texture approach.

In texture-based volume rendering it is a common method to color the volume data via the pixel map when it is transferred from host memory to texture cache. This means that the 3D texture must be reloaded every time the lookup table for the volume has changed. If we use the glDrawPixel call for our method, the pixel map is applied when the data are transferred from host memory to the framebuffer. If the lookup table is changed now, no texture has to be reloaded, only the pixels are drawn as usual. This should speed up the shadow method for applications, where the many lookup table manipulations occur.

As the properties of the volume data may vary very much, depending on how the data were acquired, it may be necessary to adjust the intensity of the shadows. While in some cases one may want to have a strong shadow in the scene to get an aesthetically pleasing image, strong shadows may be rather disturbing in volumes with high transparencies. Fortunately, the shadow intensity can be regulated by applying the pixel map to any step of our method, because the pixel drawing, copying and reading operations can be done via the pixel map. We did not have to make extensive use of this feature, as our results were fine with the method as described, but if there should be the need to do so, there are many ways of fine tuning.

The images our method produced so far show physically accurate shadows, because semitransparent voxels cast a light shadow and strong shadows appear lighter on semitransparent voxels than on opaque ones, as can be seen in FIG. 7. On fully opaque geometric objects the shadow seems to be even a little too sharp, though geometrically correct. But as volume data-sets usually have smooth transitions from opaque to more transparent voxels, this does not impair the realism that is added to volume renderings in medical applications, as is shown in FIG. 8.

FIGS. 6 and 7 also show that the shadowed volumes look as if they were diffusely illuminated, although no illumination calculation was actually performed. This surprising effect stems from the fact that the shadows follow the contour of the volume, and thus provide an additional visual cue about its shape. Together with the consistent darkening of those sides facing away from the light direction, the visual impression of a shaped, illuminated volume arises. This nice effect is particularly interesting because, as van Gelder and Kim pointed out, illumination helps in understanding the spatial structure of the volume (as shadows do) which is desirable on its own, and here comes free along with the shadows. Of course, this is no "real" illumination, it merely appears as if there was some illumination, but it nevertheless increases the quality of the visualization.

The method was developed on a Silicon Graphics Octane MXI workstation with 4Mb texture memory. We compared rendering results with shadowed and unshadowed volumes rendered in a 600×600 pixel sized window. The volume size was limited to 128×128×64 voxels to assure that the 3D texture fits into the Octane's texture memory without getting into texture bricking struggle.

TABLE 1

Benchmarking results for SGI Octance MXI

| volume size in voxels | texture planes | unshadowed fps | shadowed fps |
|---|---|---|---|
| 64 × 64 × 64 | 64 | 6.3 | 3.6 |
| 64 × 64 × 64 | 128 | 3.3 | 2.3 |
| 64 × 64 × 64 | 256 | 1.7 | 1.4 |
| 128 × 128 × 64 | 64 | 5.0 | 1.8 |
| 128 × 128 × 64 | 128 | 2.6 | 1.4 |
| 128 × 128 × 64 | 256 | 1.3 | 0.9 |

As one can see, the performance decrease for shadowing the volumes depends on the volume size and not on the number of texture planes used to visualize the data-set. This is not surprising, since shadowing the volume is a preprocessing step to the texture-based volume rendering. For practical applications, we found that using about 256 texture planes gives the best trade-off between image quality and performance for unshadowed volume rendering. Fortunately, in this case our method decreases performance only by about 30%. Even for larger volumes than 128×128×64 voxels the method would perform well, compared to the unshadowed case, if we also increased the number of texture planes. The method gives a bad performance when only a little number of texture planes in a large volume is used. But if one wants to render an image with only a few texture planes, one is unlikely to be interested in details and so will abandon a shadowed volume anyway.

In conclusion, we developed and implemented a method that incorporates shadows in a texture-based volume renderer to increase realism of the resulting images. By using the incremental property of the shadow we were able to achieve this without decreasing performance by more than 50%. Rendering and blending of data and shadows can be performed in real time on modem workstations. This is achieved by the fact that most operations take place in the graphics hardware's framebuffer, while only little mathematical calculation has to be done in processor memory. The method can be implemented with the standard OpenGL 1.1 API, although three-dimensional textures, that will be part of the upcoming OpenGL 1.2 standard, simplify the visualization process.

What is claimed is:

1. Method for processing volumetric image data of a semitransparent object generating a shadow due to light of a light source impinging onto the object in a direction defined by a light vector, wherein each volumetric image data represents a value of transparency and a value of brightness and wherein the method comprises:

(a) dividing the volumetric image data into several image slice data representing individual layers of the object arranged sequentially behind each other, (b) on the basis of the light vector and the values of transparency of the image slice data of the object layer being closest to the light source, generating a shadow value for each image slice data of the object layer being closest to the light source and storing these shadow values, (c) overlaying the stored shadow values generated in step (b) and the brightness values of the image slice data of the object layer second most close to the light source according to the light vector and the distance between these two adjacent object layers, (d) on the basis of the light vector and the values of transparency of the image slice data of the object layer second most close to the light source, generating shadow values for each image slice data of the second most close object layer and adding these values to the stored shadow values, (e) overlaying the stored shadow values generated in step (d) and the brightness values of the image slice data of the object layer third most close to the light source according to the light vector and the distance between these two adjacent object layers, (f) performing steps (d) and (e) for each object layer which is next in the direction away from the light source, and (g) volume rendering the brightness values of the image slice data of the object layer closest to the light source and the overlaid shadow and brightness values of the image slice data of all the other object layers to display the semitransparent object including the shadow generated by the semitransparent object.

2. Method according to claim 1, wherein the overlaying step (e) comprises a step of blending the brightness and shadow values according to a blending function.

3. Method according to claim 1, wherein overlaying stored shadow values according to the light vector and the distance between two adjacent object layers comprises:

computing an offset using a tangent function, and overlaying stored shadow values according to the offset.

* * * * *

UNITED STATES PATENT AND TRADEMARK OFFICE
CERTIFICATE OF CORRECTION

PATENT NO. : 6,771,263 B1
DATED : August 3, 2004
INVENTOR(S) : Uwe Behrens and Ralf Ratering It is certified that error appears in the above-identified patent and that said Letters Patent is hereby corrected as shown below:

Title page,
Item [22], PCT filing date, "Dec. 10, 1999" should be -- Oct. 12, 1999 --

Signed and Sealed this

Twelfth Day of October, 2004

JON W. DUDAS
*Director of the United States Patent and Trademark Office*